United States Patent [19]

Bourke et al.

[11] 4,217,527
[45] Aug. 12, 1980

[54] ELECTRICAL VEHICLE CONTROLLER WITH PROGRAMMED MOTOR CURRENT

[75] Inventors: Robert F. Bourke, Kamiah, Id.; David M. Thimmesch, Elgin, Ill.

[73] Assignee: Gould Inc., Rolling Meadows, Ill.

[21] Appl. No.: 943,873

[22] Filed: Sep. 19, 1978

[51] Int. Cl.² .............................................. H02P 5/40
[52] U.S. Cl. ..................................... 318/139; 318/341; 318/338; 318/434
[58] Field of Search ............... 318/332, 432, 433, 434, 318/139, 338, 430, 395, 406, 341

[56] References Cited

U.S. PATENT DOCUMENTS

| 3,569,810 | 3/1971 | Thiele | 318/341 |
| 3,582,746 | 6/1971 | Nye, Jr. et al. | 318/434 |
| 4,123,692 | 10/1978 | Gilmore et al. | 318/341 |

Primary Examiner—David Smith, Jr.
Attorney, Agent, or Firm—Charles S. Oslakovic; Russell E. Baumann

[57] ABSTRACT

A variable duty cycle power converter operable in a current controlled loop and having means for delivering increased load current at low duty cycles for efficient use of the switching elements in the converter. A current limit is established for maximum duty cycle which allows current flow through the power switching elements near but within the ratings of the devices. The maximum limit is programmed as a function of duty cycle to allow increased load current flow while maintaining the current through the power switching devices within ratings. As a result substantially increased current can be provided at low duty cycles without the need for using power switching devices of increased rating.

8 Claims, 5 Drawing Figures

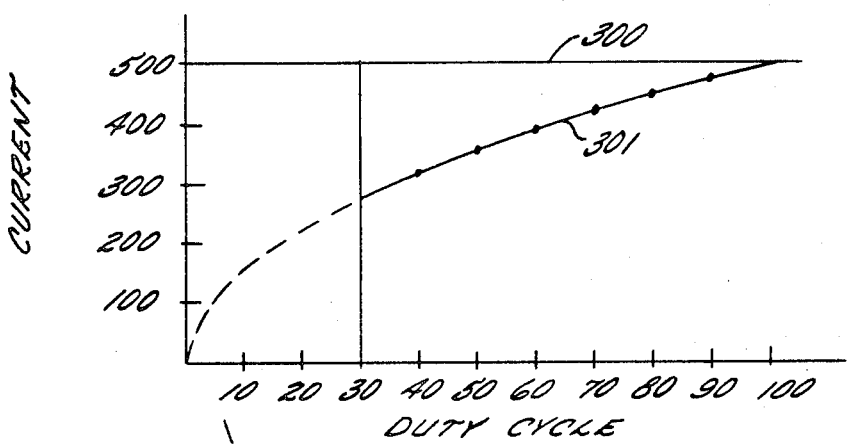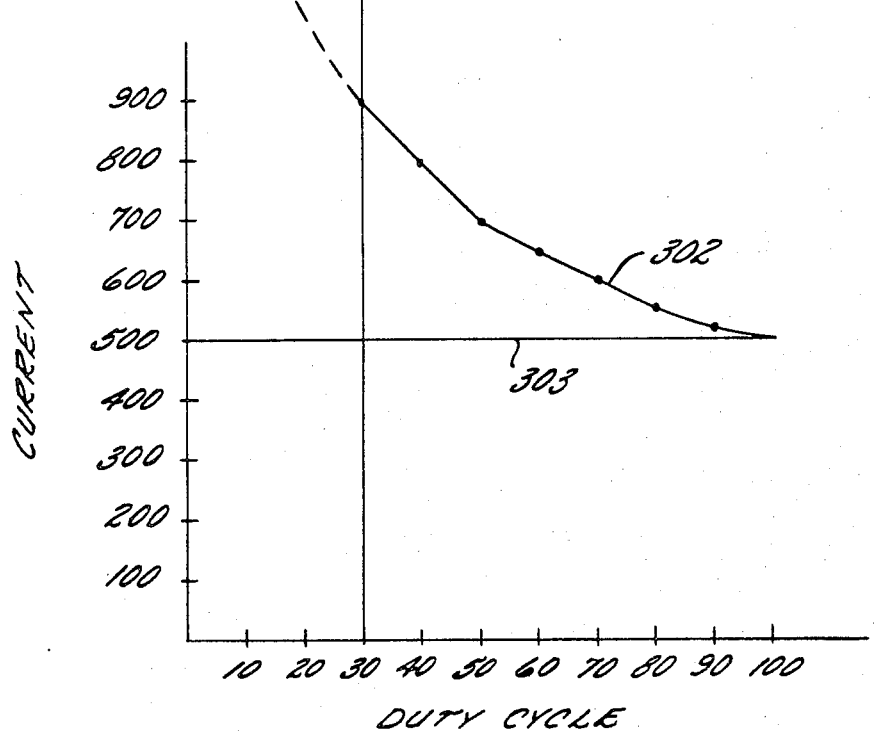

ELECTRICAL VEHICLE CONTROLLER WITH PROGRAMMED MOTOR CURRENT

This invention relates to power converters and more particularly to such converters having a relatively wide output range and capable of efficient operation across said range.

Among the uses for a power converter of the type described herein is application as the control element in the propulsion system of an electric vehicle. Electric vehicles, especially those designed for on-the-road use impose severe requirements on propulsion systems. Such systems, for example, demand a rather wide range of rather precise control such that the vehicle can accelerate, brake or cruise, and is responsive in the way generally expected of internal combustion engine vehicles to simple control by accelerator and brake. Thus, at any point in time, the demands on the propulsion system may be very slight, as in slow acceleration or cruising, but the demand may suddenly change, such as by a demand for very rapid acceleration. The power converter in such a system must be capable of supplying controlled power from a propulsion battery to a motor, and must have a sufficiently wide output range to accommodate all of the expected conditions.

Due to economic considerations as well as to the need to minimize weight, it is desirable to provide such capabilities in a manner which will efficiently utilize components at their ratings, without requiring the need for expensive, potentially bulkier components of higher rating. For example, while it might be convenient to provide for a relatively high current flow upon initial acceleration in order to produce a desirable amount of torque, achieving that simply by beefing up all of the components of the converter would adversely affect cost and probably weight.

Christianson and Bourke U.S. Pat. Nos. 3,958,173 and 4,008,423 describe a power converter and electric vehicle apparatus capable of on-the-road use. The power converter is connected in a current controlled loop and serves to match a signal related to actual armature current with an input signal related to demanded armature current in order to adjust the duty cycle of the converter to cause the actual signal to match the demanded. In order to protect the power switching elements and to utilize the batery near its peak operating point, a maximum limit is imposed on the input demand signal. In an exemplary embodiment of that system, the maximum signal was approximately 500 amps irrespective of the speed of the vehicle or the operating conditions of the converter. As a result, under all conditions, current flow through the power switching elements, namely the SCR's in the chopper, was limited to device ratings. For example, 250 amp SCR's could be utilized in the dual chopper taught therein, and would be capable of providing the 500 amp maximum armature current for any condition encountered.

It has now been realized that the power switching elements in that system were operated near their rated levels only near the 100% duty cycle point of the chopper. At lesser duty cycles the maximum current limit established for the demand signal prevented the power switching elements from reaching rated operating levels, thereby limiting the torque which the vehicle was capable of producing to an unnecessarily low level.

In view of the foregoing, it is an aim of the present invention to provide a variable duty cycle power converter capable of providing output currents apparently in excess of device ratings at low duty cycle in such a manner as to prevent the current ratings from actually being exceeded.

More specifically, it is an object of the present invention to program the maximum load current level in accordance with duty cycle so as to allow the system to demand increased load current levels at low duty cycles while maintaining current through the power switching elements within device ratings.

Thus, it is an object to provide enhanced torque at low duty cycle without the need for utilizing power switching elements of excessive ratings.

Other objects and advantanges will become apparent from the following detailed description when taken in conjunction with the drawings in which:

FIGS. 4a and 4b are graphs ilustrating the effect of programming the motor current.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
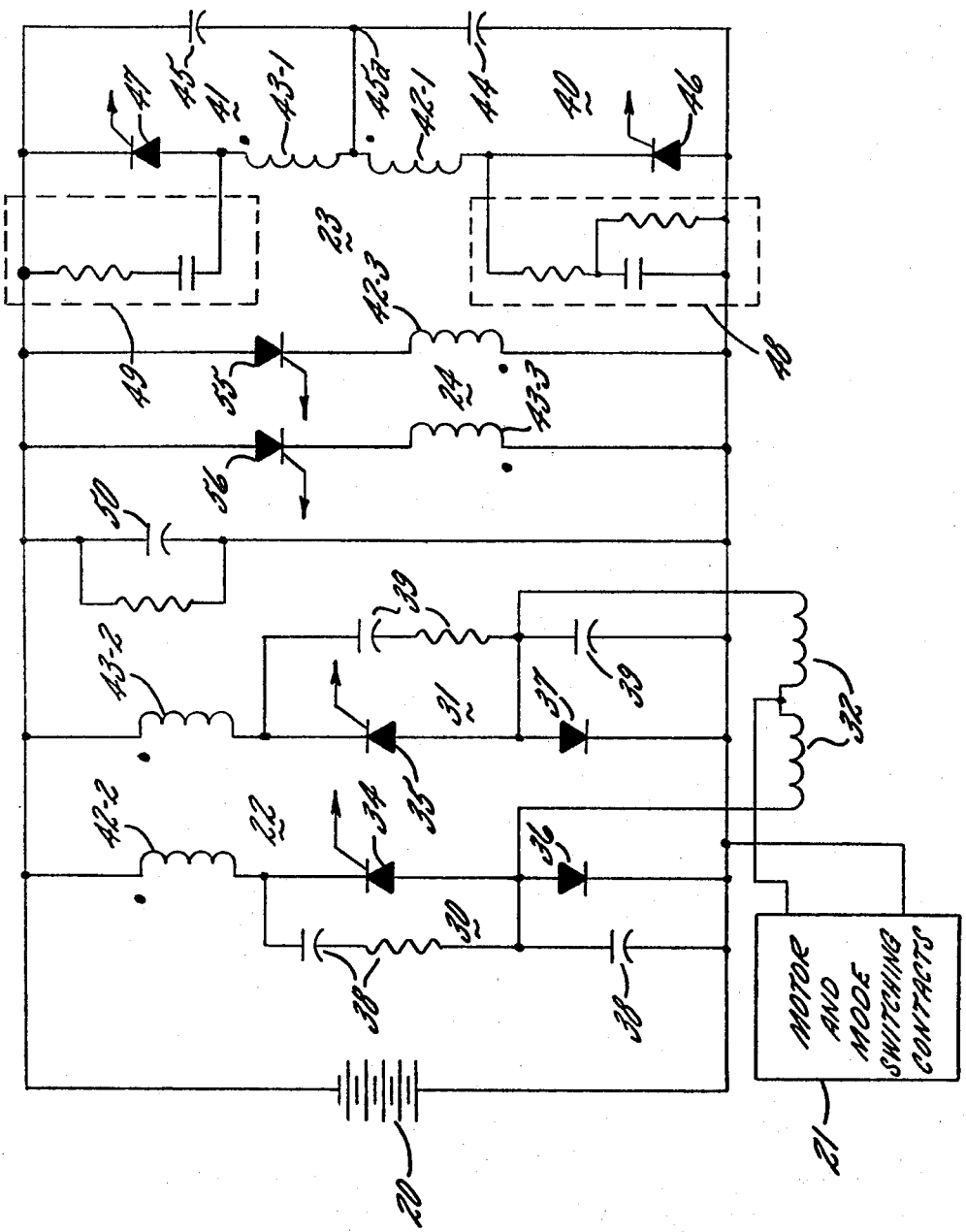
FIG. 1 is a schematic diagram illustrating the power portion of an electric vehicle propulsion system.

Turning now to FIG. 1, there is shown the power portion of the converter circuit in the environment of a battery powered electric vehicle including a main propulsion battery 20, a propulsion motor and its associated switching components indicated diagramatically at 21, a main chopper circuit 22, a commutating inverter 23, and clamp circuitry 24 for limiting the energy level in the commutation circuit 24. The propulsion battery 20 may be a conventional lead acid storage battery or other high energy density storage battery. In one embodiment of the invention it was found convenient to use a storage battery of about 65 volts nominal terminal voltage. The propulsion motor 21 is preferably a separately excited DC motor having a contactor switching arrangement for powering the motor in an armature control mode for low speed and high torque, and in a field control mode for higher speeds. However, since mode switching is not necessary for the practice of the present invention, only a brief functional description will be provided. The reader is referred to the aforementioned patents for additional detail.

The main chopper 22 is preferably configured as a dual chopper having a pair of legs 30, 31 driven out of phase with respect to each other and at a variable duty cycle, the outputs of the legs being combined in an interphase transformer 32. The legs include respective thyristors, shown herein as SCR's 34, 35 and associated free-wheeling diodes 36, 37. Snubbing components 38, 39 are provided for reducing transients.

Associated with the chopper 22 for switching the thyristors in the chopper off, a commutating inverter 23 is provided, having sections 40, 41 associated with the respective chopper legs 30, 31. The commutating inverter 23 is transformer coupled to the chopper, a first transformer having a primary 42-1 magnetically coupled to a secondary 42-2 serially connected in the chopper leg 30. Similarly, the section 41 has a transformer primary 43-1 magnetically coupled to a secondary 43-2 in the chopper leg 31. The commutating inverter also includes energy storage means shown herein as a pair of capacitors 44, 45 which resonate with the aforementioned primaries under the control of thyristors shown herein as SCR's 46, 47 for delivering energy to the associated legs of the chopper for commutation thereof. As in the case of the chopper, snubbing components 48, 49 are provided for reducing transients. In addition, a network including capacitor 50 is connected across the power supply near the commutating inverter for providing a low impedance AC path for charging the commutating capacitors.

The chopper and commutating inverter cooperate in the following manner to produce current pulses of controlled duration, combined by the interphase transformer for delivery to the motor. Assuming a point in the cycle at which SCR 34 is intended to become conductive, gating circuitry to be described below triggers the SCR 34 which causes current flow from the positive terminal of the battery 20, through the motor 21, the SCR 34, the secondary 42-2 to the negative terminal of the battery. At the point in the cycle where the current pulse is to terminate, the commutating SCR 46 is triggered. As a result of previous cycles of the commutating inverter, energy is stored in capacitors 44, 45 in the form of a voltage, with the junction 45a being negative with respect to the positive bus. As a result, when the SCR 46 is triggered, the voltage present on the capacitors instantaneously appears across the primary 42-1. By transformer action, a voltage determined by the turns ratio of the transformer 42 is induced across the secondary 42-2. That voltage, being properly polled, is sufficient to reverse bias the SCR 34, thereby commutating it. When the SCR 46 is triggered in addition to commutating the chopper SCR 34, a resonant exchange of energy is initiated in the commutating inverter to charge the capacitors 44, 45 in preparation for the next commutation cycle. The chopper leg 31 cooperates with the commutating inverter section 41 in the manner just described.

At the time the SCR 34 commutates, since current flow through the motor cannot instantaneously collapse, alternate conducting means, shown herein as free-wheeling diode 36, provides a path for circulating the current flowing in the motor. Thus, the current pulse conducted to the motor from the battery through the chopper SCR 34 sets up current flow in the motor which is maintained in the alternate conducting path until SCR 35 in the opposite chopper leg is triggered to conduct another current pulse to the motor. The nature of such current pulses and their effect on the power elements of the circuit will be discussed in greater detail below.

In order to limit the energy level in the commutating inverter, a clamp circuit as described in the aforementioned patents can be used to clamp the voltage level at a preset level. Preferably, however programmable commutation circuitry as described in our application Ser. No. 943,872, filed concurrently herewith, and entitled Power Converter With Programmable Commutation is used so as to enhance efficiency. More specifically, the respective transformers 42, 43 are provided with clamp windings 42-3, 43-3, arranged so that a voltage equal to the battery terminal voltage is induced therein rather early in the commutating inverter resonant cycle. In addition, there are provided a pair of gate controlled thyristors, shown herein as SCR's 55, 56, serially coupled with the respective clamp windings 42-3, 43-3 across the battery 20. Means are provided responsive to the operating level of the chopper 22 for gating the SCR's 55, 56 to clamp the voltage in the commutating inverter at a programmed point dependent upon such operating level. Since the clamp circuitry forms no part of the present invention, further detail will not be provided herein. The reader is referred to said application for a more complete description of that invention.

Figure 2:
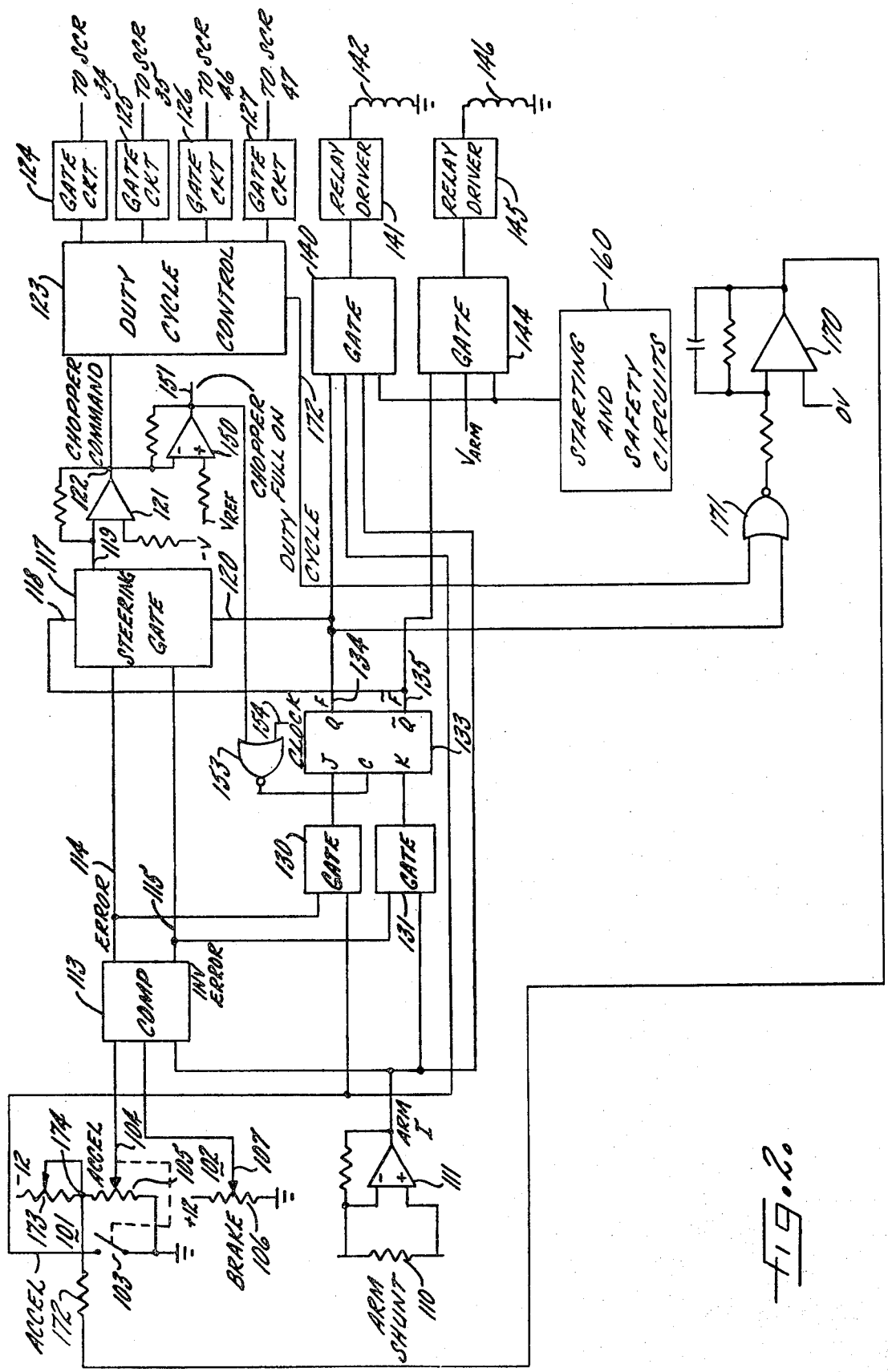
FIG. 2 is a block diagram showing control circuitry for the propulsion system and including means for programming maximum motor current.

Turning now to FIG. 2, there is shown in simplified block diagram form the control circuitry for operating the power elements ilustrated in FIG. 1. For allowing an operator to control the speed of the vehicle, accelerator controls 101 and brake controls 102 are provided. The accelerator controls comprise a switch 103 ganged to the wiper 104 of an accelerator potentiometer 105. When the accelerator pedal is depressed the switch 103 is closed, making the $\overline{ACCEL}$ signal low; the signal on the acceleration wiper 104 becomes increasingly negative with increased depression of the accelerator pedal. The brake control 102 is a potentiometer 106 having a wiper 107, the output signal of which becomes increasingly positive with increased depression of the brake pedal.

The preferred control system operates to produce an armature current in the propulsion motor which matches a demanded current, such current being demanded by either the position of the accelerator potentiometer 104 or the brake potentiometer 107. For sensing the actual armature current for comparison against the demanded current, an armature shunt 110 is provided, in series circuit relationship with the propulsion motor armature, and having a buffering amplifier 111 connected thereto for producing a signal indicative of actual armature current flow.

The demand signals from the accelerator and brake potentiometers and the actual signal from the armature shunt are coupled to a comparator 113 which compares the demand signal with the actual signal to produce an error signal on line 114 and an inverted error signal on line 115. When the accelerator is depressed, the negative signal from the potentiometer 105 is compared with the positive output of the scaling amplifier 111 which results from armature current flow to the motor. When the brake pedal is depressed, the positive signal from the potentiometer 106 is compared with the negative output of amplifier 111 which results from current flow from the motor to the battery. The comparator, in response to such conditions produces an error signal on line 114 indicative of the difference between the compared signals, and by virtue of an internal unity gain inverter, also produces an inverted error signal on line 115. Both of such signals are coupled as inputs to a steering gate 117 which selects one or the other of such signals for controlling the operating level of the power converter. The particular signal selected is dependent upon the mode in which the controller is operating at the time. In the armature control mode, the input 118 of the steering gate 117 is maintained in a high logic condition which causes the steering gate to pass the error signal 114 to its output 119. When operating in the field control mode, the input 118 is low, but the input 120 is maintained high, causing the inverted error signal on line 115 to be passed to the output 119. The signal passed by the steering gate 117 is buffered in an amplifier 121 to produce a chopper command signal on output line 122, such signal being coupled as a control input to the duty cycle control 123. The duty cycle control 123 acts through gating circuits 124-127 to trigger SCR's 34, 35, 46, 47 to control conduction in the respective legs of the chopper and thereby the duty cycle of the chopper.

When the controller has two modes, namely armature and field control, it is necessary for the duty cycle control 123 to respond differently in such modes to the error signal produced by the comparator 113. In the armature control mode, the non-inverted error signal is steered by virtue of the control input 118 through the steering gate to cause the duty cycle control 123 to increase the duty cycle from minimum toward maximum for increasing levels of error signal. However, in the field control mode, where the motor is controlled by field weakening, it is necessary to decrease the duty cycle to produce increased armature current. As a result, in the field control mode the inverted error signal 115 is passed through the steering gate 117 to cause the duty cycle control 123 to decrease the duty cycle of the chopper to produce increased armature current.

Means are provided for establishing the mode of the controller to pass the appropriate signal through the steering gate 117 and to control the power portion of the circuitry. To that end a pair of gating circuits 130, 131 are provided having inputs responsive to the error signal on line 114 and the inverted error signal on line 115, respectively, and having outputs coupled to the J and K inputs of a flip flop 133. The Q output 134 of the flip flop is high in the field control mode and low in the armature control mode, and the $\overline{Q}$ output 135 assumes the opposite condition. It is seen that the Q and $\overline{Q}$ outputs are the inputs 120, 118 respectively of the steering gate such that the error signal is passed through such gate in the armature control mode and the inverted error signal in the field control mode. The gate 130 is also connected to the accelerator switch 103, and the gate 131 connected to receive the armature current signal produced by the amplifier 111.

In operation, when the circuit is at rest, the flip flop 133 is maintained in its reset condition which, as will now be understood, establishes the armature control mode. The input 118 of the steering gate allows the error signal on line 114, if one is generated, to be passed to the duty cycle control 123. The Q output of the flip flop 133 provides an enabling signal to a gating circuit 140 connected to energize a relay driver 141 when the accelerator switch 103 is closed, which in turn energizes a relay coil 142 for closing contacts in the power circuit to set the circuit up in the armature control mode. The $\overline{Q}$ output of the flip flop 133 prevents gating circuit 144 from being energized, which maintains relay driver 145 and associated coil 146 de-energized. These conditions causes the chopper to be connected to the motor armature and the battery connected directly to the motor field.

When the accelerator is depressed the comparator 113 senses the demand for armature current and compares it to the actual armature current to produce a positive error signal 114 coupled through the steering gate 117 to cause the duty cycle control 123 to increase the duty cycle of the chopper, thereby to increase the armature current. The vehicle accelerates and armature current increases until it reaches the demanded level. However, if the duty cycle of the chopper reaches 100%, that is the controller is operating at maximum level, that condition will be sensed by an amplifier 150, responsive to the chopper command signal 122, which will respond by producing a low chopper-full-on signal at output 151. That signal enables a NOR gate 153 to pass a clock signal derived from any convenient pulsed source 154 to clock the flip flop 133.

In the condition just described, assuming that the chopper has been run up to 100% duty cycle and additional armature current is demanded, the positive error signal coupled to the gate circuit 130 in combination with the logic zero $\overline{ACCEL}$ will maintain the output of gate 130 high. Similarly, the negative inverted error signal applied to the gate 131 will maintain that gate output low. The flip flop 133 when clocked with such signals on its J and K inputs will respond by shifting its Q output high and $\overline{Q}$ output low, thereby causing the system to enter the field control mode. As a result, the inverted error signal on line 115 will be passed through the steering gate 117, causing a reduction in duty cycle of the chopper, and thereby a further increase in armature current. When the flip flop 133 changes state, the Q and $\overline{Q}$ outputs acting respectively on gates 140, 144 cause the relay driver 141 to be de-energized and the relay driver 145 to be energized. Such condition causes the controller to be switched across the motor field and the battery to be connected directly to the armature.

Mode switching from the field control mode to the armature control mode occurs in a similar manner when the duty cycle reaches 100% and the actual armature current is greater than the demanded. When the chopper-full-on signal clocks the flip flop 133, the negative state of the error signal on line 114 causes the output of gate 130 and the J input of the flip flop to be maintained low, whereas the positive state of the inverted error signal on line 115 causes the output of the gate 131 and the K input of the flip flop to be high. As a result, the clock signal will cause the flip flop to respond by switching its Q output low and $\overline{Q}$ output high, thereby returning to the armature control mode. The steering gate 117 and relay drivers 141, 145 respond in the manner described heretofore.

Control of the gates 130, 131 by the error and inverted error signals has been described. The gate 130 also has an input driven by the $\overline{ACCEL}$ signal which maintains the gate output low unless the accelerator is depressed, in order to prevent switching to the field control mode except when the accelerator is depressed. The gate 131 also has a second input which is connected to the armature current signal produced by the amplifier 111. Such signal prevents the gating circuitry 130, 131 from switching from the field to the armature control mode during regenerative braking until the current being returned to the battery falls to a predetermined level such as 60 amps.

The gates 140, 144, in addition to being driven by the Q and $\overline{Q}$ outputs of the flip flop 133 have additional inputs which will be briefly described. The $\overline{ACCEL}$ signal is coupled to the gate 140 so that when the accelerator is depressed in the armature control mode the gate 140 is enabled, thereby to energize the relay driver 141. The armature current signal produced by the amplifier 111 is also coupled to the gate 140, and serves to maintain the gate locked in until armature current falls below a predetermined level. Both the gates 140 and 144 have inputs connected to a starting and safety circuit 160 such that both gates are disabled until an active signal is produced by the starting and safety circuit. The details by which such signal is produced are not material to an understanding of the present invention. Suffice it to note that the signal is produced when the operator follows a preset procedure in "starting" the vehicle and appropriate safety sensing circuits are in their proper condition. The gate 144 receives a further signal responsive to the armature voltage, representing a further safety feature, which prevents mode switching to the field control mode under conditions of high back EMF.

In accordance with the invention, and in contrast with the system wherein the accelerator demand signal is limited to a predetermined constant level, means are provided for modifying the accelerator demand signal in dependence on the operating level of the controller. In the illustrated embodiment means are provided for producing an analog signal having a value dependent upon operating level of the controller, such means shown herein as integrating amplifier 170 having an inverting input coupled via NOR gate 171 to a duty cycle output 172 of the duty cycle control 123. The NOR gate 171 has a second input connected to the Q output of the mode control flip flop 133. Accordingly, when the controller is in the field control mode, the output of NOR gate 171 is maintained at a constant low level, maintaining the output of amplifier 170 at a predetermined fixed level. However, in the armature control mode, the Q output of the flip flop 133 is maintained at a low level, allowing the NOR gate 171 to respond to the duty cycle signal produced on line 172. In cases where mode switching is not used, or where a fixed current limit in the field control mode is not needed, it is simply necessary to connect the corresponding input of the NOR gate 171 to a low logic level, thereby disabling it. The duty cycle control 123 produces a square wave signal on output 172 having a duty cycle corresponding to the duty cycle of the chopper. In other words, the proportion of each operating period during which the signal on line 172 remains high is dependent on duty cycle. Since such signal is inverted by the NOR gate 171 and applied to the inverting input of integrating amplifier 170, the output of amplifier 170 will become increasingly negative for decreasing duty cycle. With duty cycle at 100%, the output of NOR gate 171 remains low, keeping the output of amplifier 170 at about zero volts. As the duty cycle decreases, the output of NOR gate 171 is switched high for increasing proportions of each period, driving the output of the amplifier 170 increasingly negative. It is seen that the output of the amplifier 170 is connected via a summing resistor 172 to a junction formed between a range adjustment potentiometer 173 and the acceleration potentiometer 105. As a result, as duty cycle decreases, the voltage at junction 174 becomes increasingly negative, making the demand signal on the wiper 104 of the acceleration potentiometer 105 increasingly negative. Accordingly, a greater level of armature current is demanded.

Figure 3:
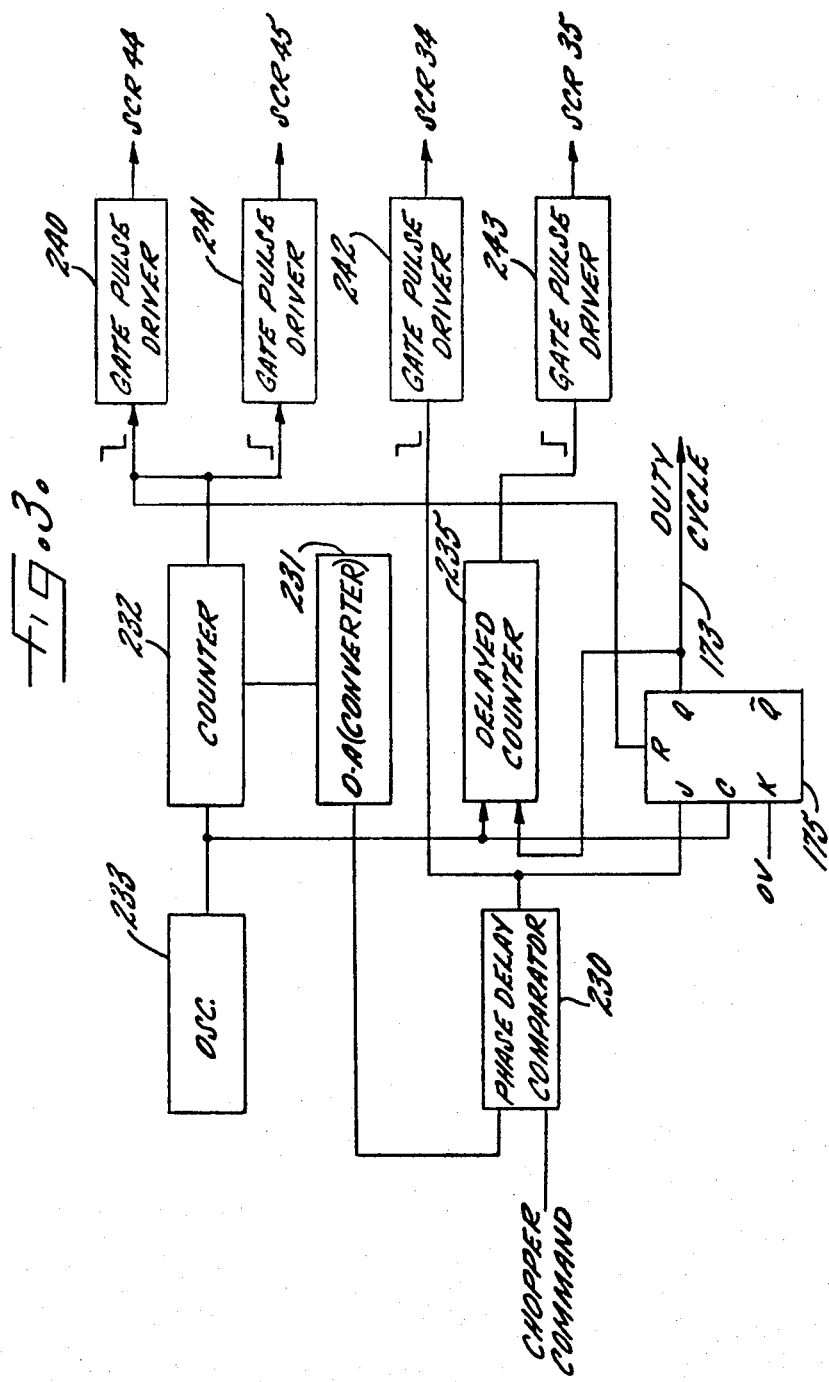
FIG. 3 is a block diagram ilustrating duty cycle control means for the chopper and means for deriving a duty cycle signal.

Before returning to the power circuit for a discussion of the effect of such control, attention will first be directed briefly to the duty cycle control 123 and the means for producing the duty cycle signal on line 172. Turning to FIG. 3, there is shown in block diagram form the duty cycle control for the chopper. Reference can be made to the aforementioned patents for a more detailed description of the circuitry. There it will be seen that the phase delay comparator has an output flip flop for controlling the reset input of the delayed counter. In FIG. 3 of the drawings of this application, the flip flop 175 is shown external to the phase delay comparator 230, for controlling the rest input of the delayed counter and also for producing the duty cycle signal on line 173. The chopper command signal described in connection with FIG. 2 is applied as an input to the phase delay comparator 230. Such signal is compared to an analog signal produced by D/A converter 231 which responds to the digital output of a counter 232 to produce a negative ramp signal as the counter fills. The counter 232 has its clock input coupled to a stable oscillator 233 which provides the main clock signal for the chopper. The oscillator 233 also has its output connected to a delayed counter 235. The delayed counter 235 has a reset input connected via the flip flop 175 to the phase delay comparator 230.

In operation the oscillator 233 continues to cycle the counter 232 to produce a square wave output of about 400 Hz. Negative transitions of the square wave activate a gate pulse driver 240 to gate the commutating SCR 44 whereas positive transitions energize a gate pulse driver 241 to gate the commutating SCR 45. Accordingly, the commutating SCR's are driven at a fixed frequency and 180° out of phase. The duty cycle of the chopper is controlled by varying the incremental time in advance of firing the commutating SCR's at which the associated chopper SCR's are fired. To that end the phase delay comparator 230 responds to the level of the chopper command signal and the negative ramp signal produced by the D/A converter 231, which in turn is responsive to the count within the cycling counter 232. When such signals are in a predetermined correspondence the phase delay comparator 230 produces an output signal which energizes gate pulse driver 242 to fire the chopper SCR 34. At the same time the phase delay comparator 230 removes a reset signal from the delayed counter 235 enabling it to count pulses produced by the oscillator 233. When the delayed counter 235 fills it produces an output signal which energizes gate pulse driver 243 to gate the chopper SCR 35. The counter 232 and delayed counter 235 have the same number of binary stages such that the delay period during which the delayed counter 235 is held in reset by the phase delay comparator serves to slave the SCR 35 to the conducting interval of the SCR 34. When the chopper is operating at relatively low duty cycles, the counter 232 is allowed to advance well into its count before the phase delay comparator produces a signal to trigger the SCR 34 and remove the reset from the delayed counter 235. As a result, the commutating SCR 44 will be fired quite soon after firing the chopper SCR 34 so that the conducting interval of the leg of the chopper will be relatively short as compared to the overall period. When high duty cycles are demanded by the chopper command signal, the phase delay comparator will trigger the gate pulse driver 34 and remove the reset from the delayed counter 235 quite early in the period, so that the SCR 34 is conductive for a considerably longer proportion of the total operating period. As noted above the SCR 35 is slaved to the operating period of the SCR 34 by the delayed counter so that the duty cycles of the respective legs are matched.

In addition to illustrating control of the chopper and commutating SCR's at a variable duty cycle, the block diagram of FIG. 3 shows means for producing the duty cycle signal used as an input to the demand signal programming circuitry. The flip flop 175 is provided having a J input coupled to the phase delay comparator and a K input coupled to a low logic level. The clock input of the flip flop is driven by the oscillator 233. The flip flop also has a reset input which is connected to the output of the counter 232 so as to impose a reset signal on the flip flop with the same negative transistion which triggers the commutating SCR 44. The Q output of the flip flop produces the duty cycle signal which is output on line 173.

In operation, during the off period of the chopper SCR 34, the output of phase delay comparator 230 is low, maintaining a low signal on the J input of the flip flop 175. Accordingly, clock pulses coupled thereto by oscilator 233 will not change the flip flop 175 from its reset state. However, when the level of the chopper command signal 230 and the ramp signal produced by D/A converter 231 reach the aforementioned predetermined relationship, the output of phase delay comparator 230 switches high, applying a high signal to the J input of flip flop 175. The flip flop will respond to the next pulse produced by the oscillator 233 to switch the Q output thereof high. Since the output of phase delay comparator 230 remains high for the duration of the conducting interval of the chopper SCR 34, the Q output of the flip flop 175 will also remain high. However, when the counter 232 fills to commutate the conducting chopper leg, the negative transistion which fires the commutating SCR 44 also resets the flip flop 175. Accordingly, it will be appreciated that the Q output of the flip flop 175 remains high for the duration of the conducting interval of the SCR 34. Since the SCR 35 is slaved to the SCR 34, the square wave produced on output line 173 has a duty cycle equal to the operating duty cycle of the chopper.

It will be appreciated that the details provided above are merely exemplary of one embodiment of the invention. In the narrow sense, for example, the means for producing a duty cycle signal, rather than functioning to integrate a digital signal, could have scaled and appropriate analog signal. In the broader sense, it will be appreciated by those skilled in this art, that the invention has applicability to other forms of power converter as well as to other forms of motor. Thus, whether the power converter is a fixed frequency chopper as illustrated, or some other form of fixed or variable frequency device is not material, the important point being the alternate on-off switching action. With the realization that the invention is applicable to other forms of power converters, it follows that the invention is also applicable to other types of motors, including AC motors.

Furthermore, while the illustrated embodiment monitors conditions within the power converter to determine the operating level thereof, since the level of conduction from the battery and through the power switching devices is determined by the power converter, those parameters can be monitored as an indication of operating level. Accordingly, the concept of monitoring he operating level of the controller is intended to encompass all such equivalents.

Directing attention again to FIG. 1 the current flow through the power devices at various duty cycles will now be examined. Assuming that it is desired to deliver a maximum of 500 amps to the motor at maximum duty cycle, the main chopper SCR's 34, 35 can have RMS current ratings of 250 amps, because each chopper leg will carry half of the total motor current. When the chopper is operating at 100% duty cycle, the controlled power devices, that is the SCR's 34, 35 are conductive for substantially the entire chopper period, and accordingly are operated near their ratings of 250 amps.

However, if the demand signal is calling for 500 amps armature current, but the duty cycle of the chopper is at say 40%, the chopper will be conducting 500 amp pulses to the motor, but those pulses will occupy only 40% of the possible conducting interval. The freewheeling diodes 36, 37 will maintain the 500 amp conduction during the off period of the chopper SCR's. But because the controlled switches, namely the SCR's, are conducting for only 40% of the period, the RMS current through those devices is only about 320 amps. In that condition the chopper has substantially greater capability to satisfy an increased torque demand.

In accordance with the invention, the demand signal is modified in dependence on the operating level of the converter so as to demand load currents higher than the controlled switch ratings, but which cause current flow through the controlled switches near those ratings. For example, at 40% duty cycle, the demand signal is modified to call for a maximum of 800 amps armature current. Accordingly, 800 amp pulses will be conducted by the chopper to the load, but those pulses will occupy only 40% of the possible conducting interval. The freewheeling diodes will maintain current flow during the off period as before. The RMS value of the 800 amp pulses is only 500 amps, such that the controlled switching devices are operating within their ratings, but delivering substantially increased current to the motor with resulting increased torque. In such conditions the freewheeling diodes 36, 37 will be circulating RMS currents greater than those delivered by the chopper SCR's. Accordingly, such devices will be required to have higher ratings than the companion SCR's. However, it is relatively inexpensive as compared to the cost of controlled switching SCR's, to provide higher current power diodes.

Turning now to FIG. 4, there is illustrated the dramatic increase in performance which can be achieved according to the present invention. FIG. 4a illustrates the situation where a constant current limit of 500 amps is applied irrespective of duty cycle. The current limit is shown by the horizontal line 300. The curve 301 shows the RMS currents passed through the chopper at various duty cycles when 500 amps is flowing in the motor load. It is seen that only at 100% duty cycle is the chopper operating at rated level. At 30% duty cycle, the chopper is delivering only about 270 amps RMS, well below its rated capabilities.

FIG. 4b shows the improvement achieveable according to the present invention. The curve 302 shows the programmed demand signal achieved by the modification of the accelerator wiper signal by amplifier 170 (FIG. 2). At 100% duty cycle only 500 amps are demanded, as in the FIG. 4a case and 500 amps RMS is flowing in the chopper. However, at lower duty cycles the acceleration demand signal is modified so as to allow the operator to demand higher motor currents. For example, at 30% duty cycle the maximum demand signal is 900 amps. However, with 900 amps flowing in the motor at 30% duty cycle, the curve 303 indicates that the chopper is only delivering 500 amps RMS. Thus, the chopper is operating within its ratings, but a substantial increase in current is provided to the motor. And since that increase is provided at stall where the chopper is operating at minimum duty cycle, the torque is delivered where it is most needed.

It should be noted, that the curve 302 illustrates the maximum demand signal, that is the amount of armature current demanded when the accelerator pedal is depressed to the floor. It is entirely possible for the operator to depress the accelerator only part of the way, in which case less current will be delivered to the motor and acceleration will be less rapid. However, when the torque is needed, the system according to the present invention allows the controlled switches in the chopper to extend to their full capability to deliver the maximum torque possible.

In the foregoing example, the RMS current through the controlled switching devices was used as a convenient criteria for determining if those devices were operating within their ratings. While that concept is generally applicable, especially as it applies to SCR's, it is noted that the most significant rating is the junction temperature of the controlled switching device. Thus, while the RMS current rating of a particular SCR device might vary with duty cycle, or while RMS current rating might have little if any meaning with respect to other types of power switching devices, it is entirely possible to determine the effect of currents through the power switching devices on the junction temperature, and program current through the device to maintain the junction temperature within ratings.

It is also noted that a battery generally has a peak power curve over which it is capable of delivering maximum power. At currents either above or below the peak power current, the battery is in fact capable of delivering less power. In an exemplary embodiment of the invention, the battery operating at a low state of charge is providing 90% of its peak power capability at 500 amps, corresponding to the curve 303 FIG. 4b. Accordingly, in that system not only was the chopper operating near its maximum ratings, but the battery was delivering peak power at the time maximum capabilities were called for.

It is noted in the curves of FIG. 4 that the portions thereof below about 30% duty cycle are shown in dashed lines. In a practical situation, when a chopper is driving a motor load of the type indicated, considering the resistances of the load as well as the internal resistance of the battery, approximately 30% is the minimum workable duty cycle.

It should also be noted that the curves illustrated in FIG. 4 are only exemplary of one embodiment of the invention. In certain cases, other operating factors may control, such as a desired motor current limit less than chopper capabilities in a particular duty cycle range. Accordingly, the curves may be modified to meet that situation without departing from the spirit and scope of the invention.

We claim as our invention:

1. In combination with a battery power source, a propulsion motor, a power converter having controlled switches for controlling power delivered from the battery to the motor and alternate conducting means for maintaining current flow in the motor, the improvement comprising, control means for producing a demand signal relating to demanded motor current, sensing means for producing a signal relating to actual motor current, duty cycle control means for controlling the duty cycle of the converter to cause the actual current to match the demanded current, means for producing a duty cycle signal having a value dependent on the operating duty cycle of the converter, and means responsive to said last mentioned means for increasing the demand signal at minimum duty cycle and progressively decreasing said demand signal with increasing duty cycle so as to increase torque at low speed while maintaining the current through the controlled switches within ratings.

2. In an electric vehicle having a battery power source, a propulsion motor, a variable duty cycle power converter having controlled switches for controlling power delivered from the battery to the motor, and alternate conducting means for maintaining current flow in the motor, the improvement comprising, accelerator control means for producing a demand signal relating to demanded motor current, sensing means for producing a signal relating to actual motor current, duty cycle control means for controlling the duty cycle of the converter to cause the actual current to match the demanded current, and means responsive to the operating duty cycle of the converter for increasing the demand signal at minimum duty cycle and progressively decreasing said demand signal with increasing duty cycle so as to increase torque at low speed while maintaining the current through the controlled switches within ratings.

3. The improvement as set forth in claim 2 wherein the power converter is a chopper having gate controlled switch means operated at a controllable duty cycle to provide current pulses of controlled duration to the motor, and wherein the alternate conducting means are free-wheeling diodes for circulating motor current when the gate controlled switches are switched off, the free wheeling diodes having a current rating greater than that of the gate controlled switches so as to accommodate the higher currents circulating in said motor.

4. The improvement as set forth in claim 2 wherein the means for increasing the demand signal comprises an integrator responsive to the duty cycle control means for producing an analog signal having a level dependent on the operating duty cycle of the controller, and means coupling the integrator to the accelerator control means for adjusting the level of the demand signal.

5. In combination with a battery power source, a propulsion motor, a variable duty cycle power converter having controlled power switch means rendered alternately conductive and nonconductive for controllable portions of the converter operating interval to establish the duty cycle of the converter, and alternative conducting means for maintaining motor current during said nonconductive portions of the converter operating inverval, the improvement comprising, means for producing an input signal relating to demanded motor current, sensing means for producing a signal related to actual motor current, duty cycle control means responsive to the last two mentioned signals for controlling the duty cycle of the converter so as to cause the actual current to match the demanded, programmable current limit means for establishing a maximum current demand signal as a function of duty cycle, and means adjusting the maximum demand signal as a function of duty cycle so as to increase peak motor current at lower duty cycles while maintaining current flow through the power switch means during the on period thereof within the ratings thereof.

6. A method of increasing load current over at least a portion of the range of a variable duty cycle power converter, said power converter being interposed in a current controlled loop and including controlled power switch means having a controllable duty cycle for matching an average output current flowing in a load to a demanded current signal, said method comprising the steps of establishing a maximum limit for the demanded signal at maximum duty cycle to produce a current flow through the controlled switching devices approaching the ratings thereof, programming said maximum limit at duty cycles less than maximum to increase the demand signal beyond said ratings while maintaining current flow through the power switching means within said ratings, and providing an alternate current path for maintaining load current having a current rating higher than the rating of the power switching means for conducting circulating current during the off period of said power switch means.

7. A method of delivering increased load current over a portion of the operating range of a variable duty cycle power converter, said converter being interposed in a current controlled loop for matching an average current flowing in said load to a demanded current signal, said power converter having controlled switch means operable at a variable duty cycle for delivering current pulses of controllable duration to said load, said load being inductive in nature and having circulating diode means paralleling same for maintaining load current flow during the off period of the power switching means, said method comprising the steps of establishing a maximum amplitude for current pulses delivered at substantially 100% duty cycle of the converter, said maximum amplitude being within the ratings of said power switch means, increasing the maximum amplitude at duty cycles less than 100% such that the RMS value of the increased amplitude pulses over the operating period remains within said ratings, and providing said circulating diodes with higher current ratings than said power switch means for circulating load currents resulting from the current pulses of increased amplitude.

8. A method of increasing current flow over a portion of the range of a variable duty cycle power converter interposed in a current controlled loop, the converter having controlled switch means operated at a variable duty cycle for conducting current pulses to a load to produce an average output current flowing in said load, and having alternate conducting means for maintaining load current, said power converter being responsive to a demanded current signal, the method comprising the steps of limiting the maximum level of the demand signal at 100% duty cycle to a level approaching the ratings of the controlled switch means, increasing the maximum limit for the demand signal at duty cycles less than 100% in dependence on duty cycle to maintain the current flow through the controlled switching means near said level approaching said ratings thereby to produce increased load current at low duty cycles.

* * * * *